(12) United States Patent
Birk et al.

(10) Patent No.: US 7,634,803 B2
(45) Date of Patent: Dec. 15, 2009

(54) METHOD AND APPARATUS FOR IDENTIFYING PURPOSE AND BEHAVIOR OF RUN TIME SECURITY OBJECTS USING AN EXTENSIBLE TOKEN FRAMEWORK

(75) Inventors: Peter Daniel Birk, Austin, TX (US); Ching-Yun Chao, Austin, TX (US); Hyen Vui Chung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 10/882,053

(22) Filed: Jun. 30, 2004

(65) Prior Publication Data

US 2006/0015727 A1 Jan. 19, 2006

(51) Int. Cl.
*H04L 29/06* (2006.01)
*H04L 29/00* (2006.01)

(52) U.S. Cl. .................. 726/8; 726/2; 726/3; 726/4; 726/5; 726/6; 726/9; 713/171; 713/172; 713/173

(58) Field of Classification Search .............. None
See application file for complete search history.

(56) References Cited

U.S. PATENT DOCUMENTS

| | | | |
|---|---|---|---|
| 5,765,153 A | 6/1998 | Benantar et al. | |
| 5,908,469 A * | 6/1999 | Botz et al. ................. | 726/4 |
| 6,330,562 B1 * | 12/2001 | Boden et al. ............... | 707/10 |
| 6,829,712 B1 * | 12/2004 | Madoukh ................... | 726/2 |
| 6,898,714 B1 * | 5/2005 | Nadalin et al. ............. | 726/5 |
| 7,137,006 B1 * | 11/2006 | Grandcolas et al. ........ | 713/180 |
| 7,234,370 B2 | 6/2007 | Kim | |
| 7,302,569 B2 * | 11/2007 | Betz et al. ................... | 713/167 |
| 7,353,535 B2 | 4/2008 | Kaler et al. | |
| 7,441,264 B2 * | 10/2008 | Himmel et al. ............. | 726/2 |
| 2005/0044398 A1 * | 2/2005 | Ballinger et al. ........... | 713/200 |
| 2005/0273844 A1 * | 12/2005 | Dapkus et al. .............. | 726/9 |
| 2006/0095779 A9 | 5/2006 | Bhat et al. | |
| 2008/0133514 A1 * | 6/2008 | Relyea ........................ | 707/6 |
| 2008/0168528 A1 * | 7/2008 | Lin et al. ..................... | 726/1 |

OTHER PUBLICATIONS

Birk et al. Method and Apparatus for Handling Custom Token Propagation Without Java Serialization.
Birk et al. Method and Apparatus for Tracking Security Attributes Along Invocation Chain Using Secure Propagation Token.
Curbera et al., "Unraveling the Web Services Web", Mar. 2002, IEEE Internet Computing, pp. 86-93.

* cited by examiner

*Primary Examiner*—Syed A. Zia
(74) *Attorney, Agent, or Firm*—Yee & Associates, P.C.; Jill A. Poimboeuf

(57) ABSTRACT

An extensible token framework is provided for identifying purpose and behavior of run time security objects. The framework includes a set of marker token interfaces, which extends from a default token interface. A service provider may implement one or more marker token interfaces for a Subject or a thread of execution. A service provider may also implement its own custom marker tokens to perform custom operations. The security infrastructure runtime recognizes behavior and purpose of run time security objects based on the marker or custom marker token interfaces the token implements and handles the security objects accordingly.

17 Claims, 13 Drawing Sheets

METHOD AND APPARATUS FOR IDENTIFYING PURPOSE AND BEHAVIOR OF RUN TIME SECURITY OBJECTS USING AN EXTENSIBLE TOKEN FRAMEWORK

CROSS REFERENCE TO RELATED APPLICATIONS

The present invention is related to the following applications entitled "METHOD AND APPARATUS FOR HANDLING CUSTOM TOKEN PROPAGATION WITHOUT JAVA SERIALIZATION", Ser. No. 10/882,118, filed on Jun. 30, 2004; "METHOD AND APPARATUS FOR TRACKING SECURITY ATTRIBUTES ALONG INVOCATION CHAIN USING SECURE PROPAGATION TOKEN", Ser. No. 10/882,052, filed on Jun. 30, 2004. Both related applications are assigned to the same assignee and are incorporated herein by reference.

BACKGROUND OF THE INVENTION

1. Technical Field

The present invention relates to an improved network data processing system. Particularly, the present invention relates to security attribute propagation in a network data processing system. Still more particularly, the present invention relates to using an extensible token framework for identifying purpose and behavior of run time security objects in a network data processing system.

2. Description of Related Art

As the popularity of the Internet has increased in recent years, more and more consumers and service providers perform transactions over the World Wide Web. These transactions include secured transactions, which require authentication and authorization of a user or a service requester. An example of a secured transaction is a banking transaction, which requests a user to enter a login name and password prior to giving access to the user's bank account information. This type of transaction prevents perpetrators from gaining access to protected information.

However, service providers discover that single point of authentication is more suitable to secured transactions that require many disparate systems, including, for example, the WebSphere Application Server, a product available from International Business Machines Corporation. The single point of authentication is facilitated by using reverse proxy servers (RPS). A RPS is a proxy server placed in front of the firewall that mirrors an actual Web server behind the firewall, such that malicious attacks on the actual Web server are prevented by denying invalid incoming requests.

Within the reverse proxy servers, security attributes from users or service requesters' original logins are retained. These attributes include, for example, static attributes from the enterprise user registry and dynamic attributes from custom login logic based upon location, time of day, and authentication strength. By having access to these attributes, application servers, such as, for example, the WebSphere Application Server, may perform necessary authentication and authorization operations. In addition, backend systems may use these attributes to determine identity of the original requester and make access decisions and audit records accordingly. The backend systems include Customer Information Control System (CICS) and DB2 Universal Database, which are products available from International Business Machines Corporation.

In existing security infrastructures, attempts are made to propagate these security attributes beyond the server which performs the login. Such attempts include a trust association interceptor (TAI) interface that acts as a security gateway to the WebSphere Application Server for incoming requests that are received through the reverse proxy server. However, the TAI interface is designed to only accept a user name of the authenticated user and ignore all other security attributes that are collected from the original login at the reverse proxy server. Other security attributes may include custom tokens that carry authorization attributes useful to other systems downstream. As a result, a "re-login" to the configured user registry is required by the application server to re-gather many of the security attributes. Unfortunately, the "re-login" attributes gathered may not include attributes that are originally collected at the reverse proxy server, which are useful to a third-party authorization engine or other custom applications. These attributes include original authentication strength, client location and IP address, among other custom attributes gathered during a login.

Furthermore, security run time object types currently supported by the Java™ authentication and authorization framework are not defined. The JAAS framework, a product available from Sun Microsystems, Inc., is a standard authentication and authorization mechanism used by application servers.

SUMMARY OF THE INVENTION

The present invention provides a method, apparatus and computer instructions for identifying behavior of run time security objects in a network data processing system. In a preferred embodiment, the present invention provides an extensible marker token framework that includes a set of marker token interfaces. Each of the set of marker token interfaces extends from a fundamental token interface that defines a set of default methods. When a service provider implements one or more marker token interfaces or creates its own version of the marker token, the security infrastructure run time of the network data processing system may identify the purpose and behavior of run time security objects at each authentication plug point. Once the purpose and behavior is identified, the security infrastructure run time may handle the run time security objects accordingly.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
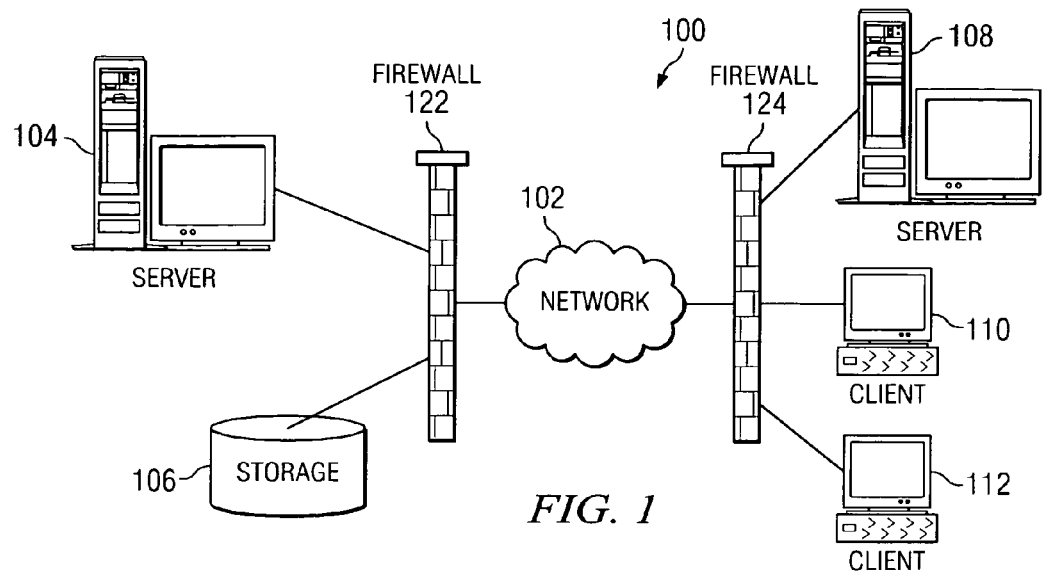
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. Also in the depicted example, server 114 is connected to server 104. Server 104 may serve authentication purpose for server 114. When a user logs in to server 104, the user id/password may be passed from server 104 to server 114. Firewall 122 acts as a gateway for servers 104, 114 and storage 106 to network 102 and firewall 124 acts as gateway for clients 108, 110 and 112. Firewalls 122 and 124 prevent unauthorized users from accessing server 104, storage 106, and clients 108-112.

In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
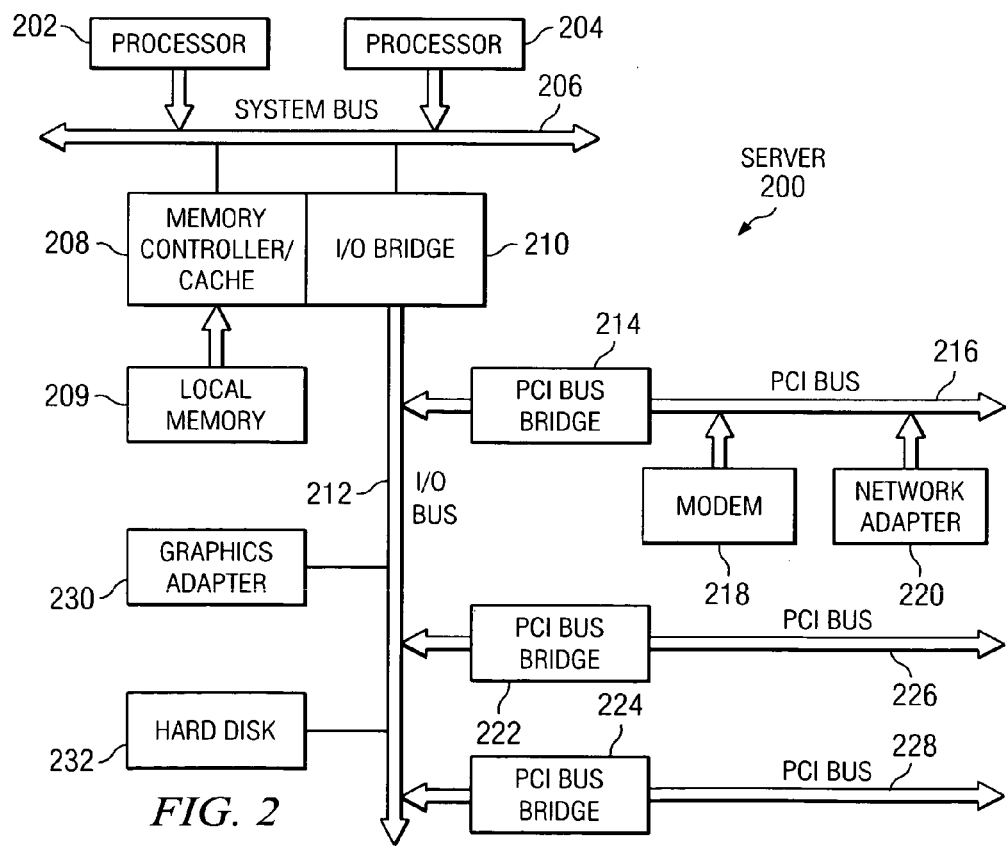
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

Figure 3:
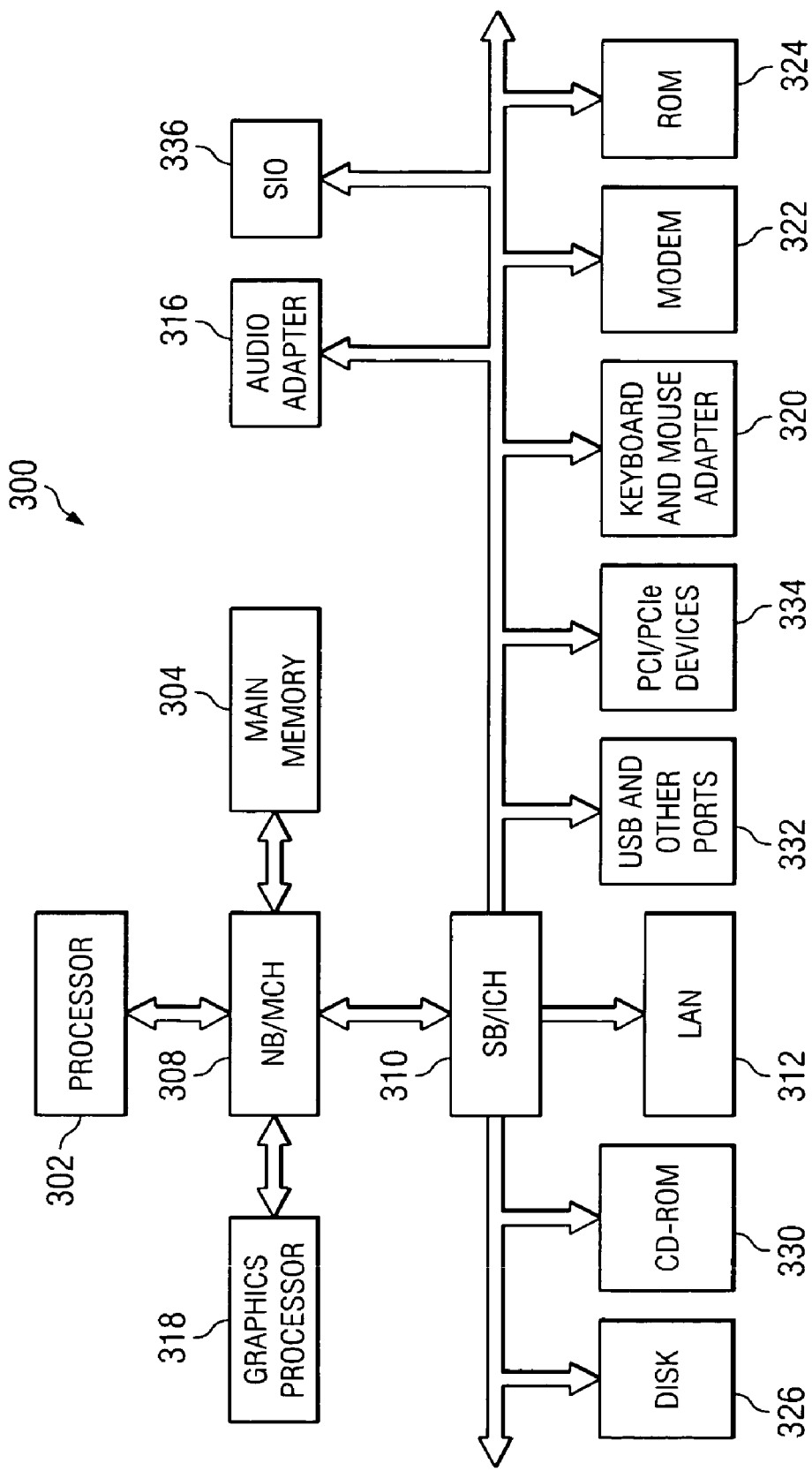
FIG. 3 is a block diagram of a data processing system in which the present invention may be implemented.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4A:
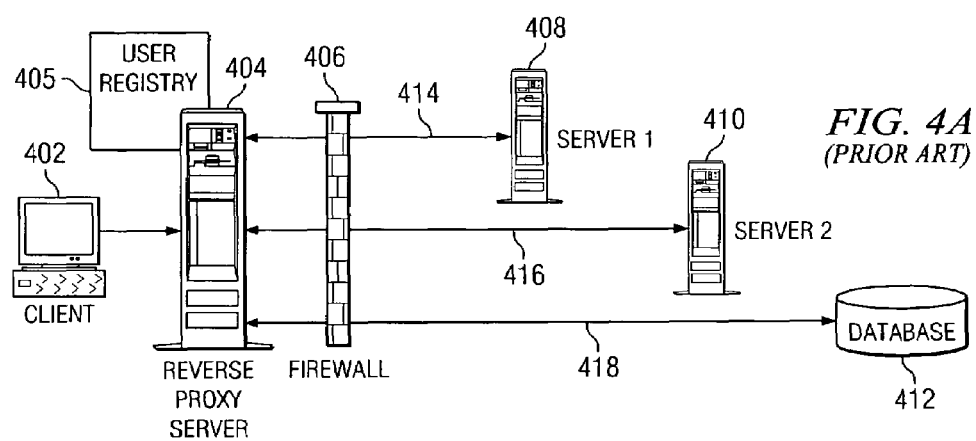
FIG. 4A is a diagram illustrating known interactions between reverse proxy server and servers downstream.

With reference to FIG. 4A, a diagram illustrating known interactions between reverse proxy server and servers downstream is depicted. As depicted in FIG. 4A, client 402 may be implemented as a data processing system, such as data processing system 300 in FIG. 3. Reverse proxy server 404, server 1 408, server 2 410, and database 412 may be implemented as a data processing system, such as data processing system 200 in FIG. 2.

When an application running on client 402 sends a request for authentication login, such as a single sign-on request, to reverse proxy server 404, reverse proxy server 404 maintains static login attributes in user registry 405. Examples of static login attributes include user id, password, groups the user is a member of, and the full username, for example, John R. Smith. Typically, reverse proxy server 404 is placed in front of firewall 406 and acts as a single entry point of authentication for login to server 1 408, server 2 410 and database 412.

Currently, when the original authentication login is performed at reverse proxy server 404, only a username is passed along to server 1 408. This username is converted to a secure authentication token which is then the only information passed to server 2 410. Thus, no dynamic attributes may be propagated downstream. Only static login attributes are presented to server 2 410 and database 412 at the time of access. Other original login information including attributes in user registry 405 and dynamic attributes, such as, for example, time of day, location and authentication strength, are not propagated to either server 1 408, server 2 410 or database 412. Therefore, server 1 408 is forced to "re-login" to reverse proxy server 404 through request 414 in order to gather information from user registry 405. Since the original login information at server 1 408 is not propagated, server 2 410 and database 412 are also forced to "re-login" to user registry 405 through requests 416 and 418 in order to further gather necessary original login information.

The requirements of "re-login" affects performance throughput, since a remote user registry call is made to user registry 405 at each hop, which significantly increases network traffic. Particularly, in a high traffic flow system, remote registry calls become very expensive and inefficient. In addition, since the user registry is accessible by many different processes, it often becomes a bottleneck when multiple processes compete for a registry lookup.

Figure 4B:
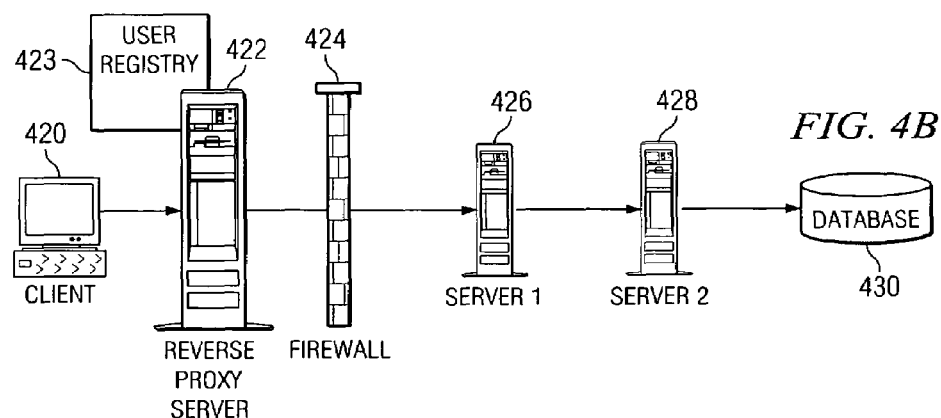
FIG. 4B is a diagram illustrating interactions between reverse proxy server and servers downstream in accordance with a preferred embodiment of the present invention.

Turning now to FIG. 4B, a diagram illustrating interactions between reverse proxy server and servers downstream is depicted in accordance with a preferred embodiment of the present invention. As illustrated in FIG. 4B, when client 420 sends a request to reverse proxy server 422 for authentication login, reverse proxy server 422 propagates original login information, which includes static attributes from user registry 423 and dynamic attributes, to server 1 426 through firewall 424. Using the mechanism of the present invention, server 1 426 is capable of propagating original login information to server 2 428, which in turn propagates the information to database 430. Thus, "re-login" requests are no longer necessary with the mechanism of the present invention since original login information is propagated downstream and performance throughput is greatly improved due to reduced network traffic.

Figure 5:
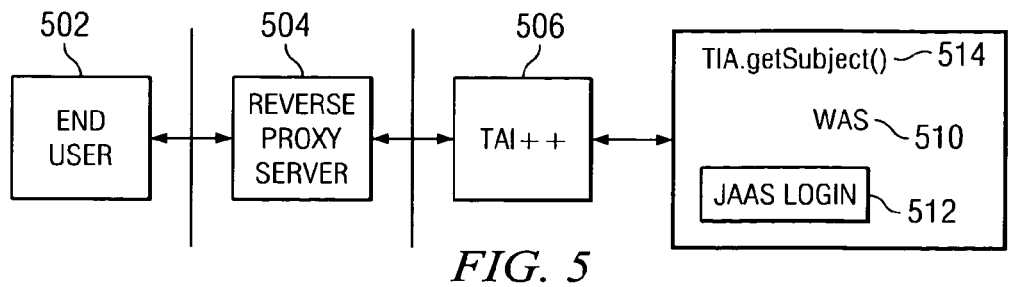
FIG. 5 is a diagram illustrating interaction between components of the present invention in accordance with a preferred embodiment of the present invention.

Turning next to FIG. 5, a diagram illustrating interaction between components of the present invention is depicted in accordance with a preferred embodiment of the present invention. As shown in FIG. 5, in this example implementation, end user 502 sends an authentication request to reverse proxy server 504. Reverse proxy server 504 then forwards the end user's identity to trust association interceptor (TAI) 506, which acts as a security gateway between end user 502 and application server 510. The user identity may include a user id and password. The TAI interface in turn passes the user's identity to application server 510, such as a WebSphere Application Server.

In the prior art, with only user's identity, application server 510 has to re-login to reverse proxy server 504 to gather original login information. With the present invention, a default JAAS login module 512 or custom login module may be plugged in JAAS login configuration implemented by application server 510 to map original login information from reverse proxy server 504 to a credential and principal of a Subject stored at run time. The Subject is created using TAI.getSubject method 514 in these illustrative examples. Thus, using a default or custom login module of the present invention, authorization and authentication information may now be propagated downstream to other servers.

The present invention provides a method, apparatus and computer instructions for identifying a purpose and behavior of run time security objects in a security infrastructure of a data processing system. In a preferred embodiment, the present invention provides a token framework within the security infrastructure of an application server, such as, for example, a WebSphere application server. A token is an object that encapsulates information, which may or may not be security related. The token framework includes a set of marker token interfaces. Each of the marker token interfaces extends from a default token interface. The default token interface provides a set of methods that are implemented by each of the marker token implementations.

In the present invention, a service provider may implement one or more marker token interfaces to define run time security objects or marker tokens, which may participate in representing uniqueness of a Subject. The Subject is stored in a cache at run time to represent an authenticated user. The present invention provides four types of marker token interfaces: authentication token, authorization token, single sign-on token, and propagation token. Each marker token type performs different functions at run time and has different token security requirements, such as, for example, encryption or signature requirements.

The authentication, authorization and single sign-on tokens are associated with a Subject at run time, allowing a service provider to identify security attributes from a Subject in order to make access control decisions. The propagation token is associated with a thread of execution instead of a Subject and is propagated along the invocation chain. The propagation token tracks user switches, host switches and stores custom security attributes. All of the marker tokens may be propagated downstream to other service providers.

Using the token framework of the present invention, the security infrastructure runtime may identify the purpose and behavior of a marker token based on the token interface the marker token implements. For example, a service provider may implement a single sign-on token, which the security infrastructure runtime uses to set the marker token as a cookie in a hypertext transfer protocol (HTTP) response. The service provider creates and adds the single sign-on token to a Subject. In turn, the security infrastructure runtime recognizes that the token is a single sign-on token based on the single sign-on marker token interface it implements.

In addition, when a service provider propagates authentication and authorization attributes downstream, the security infrastructure runtime may determine which tokens are to be propagated and how the tokens are propagated based on the marker token interfaces the tokens implement. For example, the security infrastructure run time may propagate an authentication token downstream in a different manner than an authorization token.

In an alternative embodiment, a service provider may create its own version of the marker token or a custom marker token instead of implementing one of the four default marker token interfaces. The service provider then associates the custom marker token to a Subject. In this way, the service provider may implement its own methods in the custom marker token to further define a purpose and behavior of run time security objects for a Subject.

Furthermore, using the marker token interfaces provided by the present invention, the functionality of the security infrastructure is extended. This extensibility is achieved by allowing different service providers to implement multiple implementations of the same marker token interfaces and providing a way to handle the multiple implementations of the same marker token interface in the same manner. Moreover, a service provider may implement one, more than one, or all of the marker token interfaces for a Subject.

Figure 6:
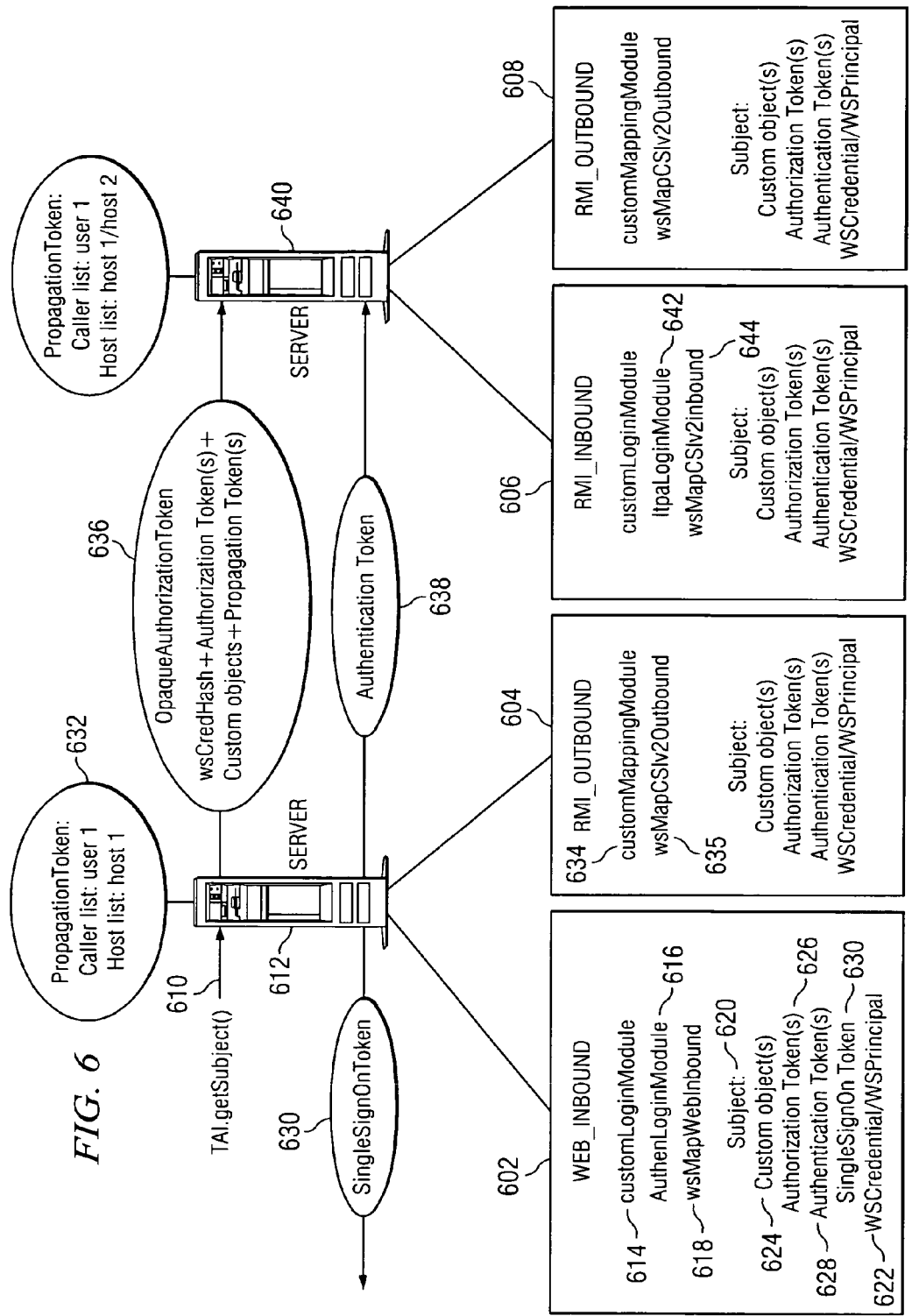
FIG. 6 is a diagram illustrating mechanism of the present invention used for security attribute propagation in accordance with a preferred embodiment of the present invention.

Turning now to FIG. 6, a diagram illustrating an exemplary mechanism of the present invention used for security attribute propagation is depicted in accordance with a preferred embodiment of the present invention. As depicted in FIG. 6, the mechanism of the present invention extends the Java™ Authentication and Authorization Service (JAAS) framework, a product available from Sun Microsystems, Inc. The JAAS framework allows pluggable login modules to be used for performing authentication regardless of underlying authentication technology.

The present invention provides default login configurations, which include Web inbound login configuration 602, inbound login configuration 604 and outbound login configuration 606. Each login configuration includes a number of login modules that are called in sequence for an authentication login.

In this example implementation, Web inbound login configuration 602 is used for Web resource login and handling of hypertext transfer protocol (HTTP) requests and responses. Web inbound login configuration 602 includes custom login module 614, authentication login module 616 and map Web inbound login module 618.

When a TAI.getSubject call 610 is invoked at server 612, Web inbound login configuration 602 receives a user identity from the trust association interceptor (TAI), which is an interface used by an application server, such as a WebSphere Application Server, to gather user information. The user identity passed in may include authorization attributes gathered at the reverse proxy server along with authentication data or only authentication data. The authentication data may include a token or user id/password. If the user identity passed into Web inbound login configuration 602 includes gathered authorization attributes, authentication login module 616 is bypassed and map Web inbound login module 618 is invoked to map authorization and authentication data from the user identity to a principal and credential of a Subject.

According to the JAAS framework, a Subject represents the source of a request. In these examples, a Subject may be an entity, such as a person or service. Once the Subject is authenticated, the Subject is populated with associated identities or principals. A Subject may have many principals. In addition, a Subject also has security attributes, referred to as credentials, which may be private or public. Different permissions are required to modify different credentials in these examples.

Using the user identity passed in from TAI, Subject 620 is created by map Web inbound login module 618 to map all gathered authorization attributes into corresponding principals and credentials 622. The map Web inbound login module 618 is a default login module provided by the present invention. A custom login module, such as custom login module 614, may be implemented by a service provider to specify already gathered authorization attributes included in a Java hash table into the shared state of the login context. By specifying well-known attribute names in the Java hash table, other login modules configured in the same login configuration do not need to duplicate the same remote user registry calls and may re-use the well-known attributes specified in the hash table. The shared state of the login context is accessible by the login modules at run time.

In addition to credentials and principals, the present invention allows a service provider to add custom objects 624 and other security information in a form of a token into Subject 620. The present invention provides a set of token interfaces that define behaviors of security runtime objects. The set of token interfaces is herein referred to as marker tokens. There are four types of marker tokens: authorization token 626, authentication token 628, single sign-on token 630 and propagation token 632. Each marker token extends from a generic token interface that defines default methods implemented by each token. A service provider may use these default marker tokens or create its own version of the marker tokens to make access control decisions for an incoming request.

In the present invention, authentication token 628, authorization token 626 and single sign-on token 630 are Subject-based. They are stored within a Subject, such as Subject 620, at run time. Propagation token 632 is invocation-based or thread-based. In other words, propagation token 632 is stored in a security context or thread local associated with the thread of execution at run time and is not specific to a Subject. Propagation token 632 is sent along with the request downstream and is set on the target server's thread of execution.

Authorization token 626 represents the identity of a user or service requester and flows downstream. Authentication token 628 represents attributes used to make authorization decision for a user or service requester and is propagated at the authorization token layer downstream. Multiple authentication and authorization tokens may be present in Subject 620 to store authentication and authorization attributes for different mechanisms.

Single sign-on token 630 is used by a service provider to set the token in the Subject such that a cookie is returned via a HTTP response to the client browser. Single sign-on token 630 has tighter security requirements because it may flow as a cookie in the external Internet space. Single sign-on token 630 would also likely be associated with a strong encryption mechanism and has different attribute information than authentication token 628 or authorization token 626. Based on the implementation, single sign-on token 630 may also be propagated to servers downstream such that downstream servers may use single sign-on token 630 if the servers downstream are used to serve other Web-based application.

In addition, the present invention provides a getUniqueID method to define uniqueness of a Subject above and beyond the user id that is currently available. When getUniqueID method is called at run time, a service provider may return null if no uniqueness is desired for a Subject or return a string to represent uniqueness of the Subject. The unique id is used for caching purposes such that a service provider may identify a particular Subject at run time. The subject unique id is generated by aggregating the unique ids from each token included in that subject. In addition, the unique id may be carried in a single sign-on token for other servers to lookup a particular Subject, in order to ensure that the correct Subject is obtained.

Once authentication login is complete using mapped credentials/principals and marker tokens are added to Subject 620, the caller list of propagation token 632 is updated with a new user, such as user 1, and the host list of propagation token 632 is updated with a new host, such as host 1. The caller list of propagation token 632 tracks each user switch along an invocation chain and the host list of propagation token 632 tracks each server or resource the propagation token lands on during invocation.

Once the propagation token is updated, the present invention provides outbound login configuration 604, which determines target server or resource capabilities and security domain prior to propagating tokens downstream. If security attribute propagation is enabled at the target server or resource, both authentication token 640 and a new authorization token 642 will be sent downstream. Otherwise, only authentication token 640 is sent downstream. New authorization token 642 includes a hash table comprising credential attributes, an authorization token comprising credential attributes, a propagation token comprising thread-based attributes and other custom objects to be propagated downstream.

In this example implementation, outbound login configuration 604 includes custom mapping login module 634 and map outbound login module 635. Custom mapping login module 634 may be implemented as a mapping module. Based on information passed into custom mapping login module 634 including a target server realm and a effective policy, which indicates which layers of security will be performed and what security within the layer will be performed, an effective perform policy is generated. If the target server realm is supported and the perform policy allows propagation to the target server, custom mapping login module 634 maps the current authorization token and authorization attributes to a new identity that the target server understands.

Once the mapping is complete, outbound login configuration 604 invokes map outbound login module 635 to serialize contents of Subject into opaque authorization token 636. The present invention provides a Java™ helper class, such as WSOpaqueTokenHelper class, that provides protocol agnostic methods allowing any protocol to create an opaque authorization token from contents of a Subject and to convert an opaque authorization token back to contents of a Subject at the target server. The helper class first converts contents of a Subject, which may include authorization tokens, hash tables and custom objects, as well as the propagation tokens stored on the thread, to an array list of token holders. A token holder includes a name, a version and a byte array. A service provider downstream may query a specific token or object based on the name and the version of the token holder. Once the array list of token holder is created, the helper class serializes the array into opaque authorization token 636.

Thus, the helper class of the present invention enables a service provider to serialize a list of token objects into a byte array and propagate them downstream. In addition, the present invention enables custom serialization of objects by attaching a name and a version to a token holder, such that a service provider may implement a custom login module at a server downstream to look for the specific object.

After opaque authorization token 636 is created, outbound login configuration 604 sends the request, which includes opaque authorization token 636 and authentication token 638, downstream using a communication protocol, such as remote method invocation (RMI), to the target server, in this example, server 640. At server 640, inbound log in configuration 606 allows normal login to occur if information passed into inbound login configuration 606 is a user id (identity assertion), a userid/password or a lightweight third party authentication (LTPA) token. An LTPA token is a token typically created when login occurs, which includes user id and password from the user registry. The LTPA token is validated by a target server using an LTPA key, which allows the target server to decrypt a signed LTPA token. LTPA login module 642 is then invoked by inbound login configuration 606 to perform normal login.

However, if the information passed into inbound login configuration 606 includes an opaque authorization token, such as opaque authorization token 636, inbound login configuration 606 invokes map inbound login module 644 to convert the opaque authorization token 636 back to contents of a Subject. Map inbound login module 644 first validates authentication token 638. Then, map inbound login module 644 deserializes the opaque authorization token 636 into an array list of token holder objects and cycles the array list to obtain desired token holder based on the name and version of each token holder.

Once a desired token holder is located, map inbound login module 644 further converts the byte array from the token holder into a credential within a Subject. Thus, the present invention allows a service provider to implement a default or custom login module to look for a specific token or object from an array list of token holders deserialized from an opaque authorization token. This feature is achieved by examining the name and version of each token holder.

Once the Subject is recreated at server 640, map inbound login module 644 updates the host list of the deserialized propagation token by appending the host list with host 2 identifying server 640. The host list is updated since propagation token 632 lands on server 640. Similarly, outbound login configuration 608 may be implemented at server 640 in order to propagate the request further downstream.

Thus, using the set of token interfaces defined in the present invention, service providers may implement different tokens based on their different roles or behaviors in the system. Each token may be associated with different token factories and have different token formats and encryption requirements. For example, the format of a single sign-on token may be different from an authorization token and may require encryption.

In addition, having a token interface defined by the present invention, logins may be differentiated using the getUniqueID method, which allows implementation of each token to be unique. For example, if user 1 logs into server 1 at 4 pm, different access right may be implemented by giving a token a different unique id than a token that allows user 1 to login into server 1 at 5 pm. The getUniqueID method allows different value to be returned for a Subject look up. An aggregation of all unique token ids may also be placed into a single sign-on token to be used for Subject lookup.

Figure 7A:
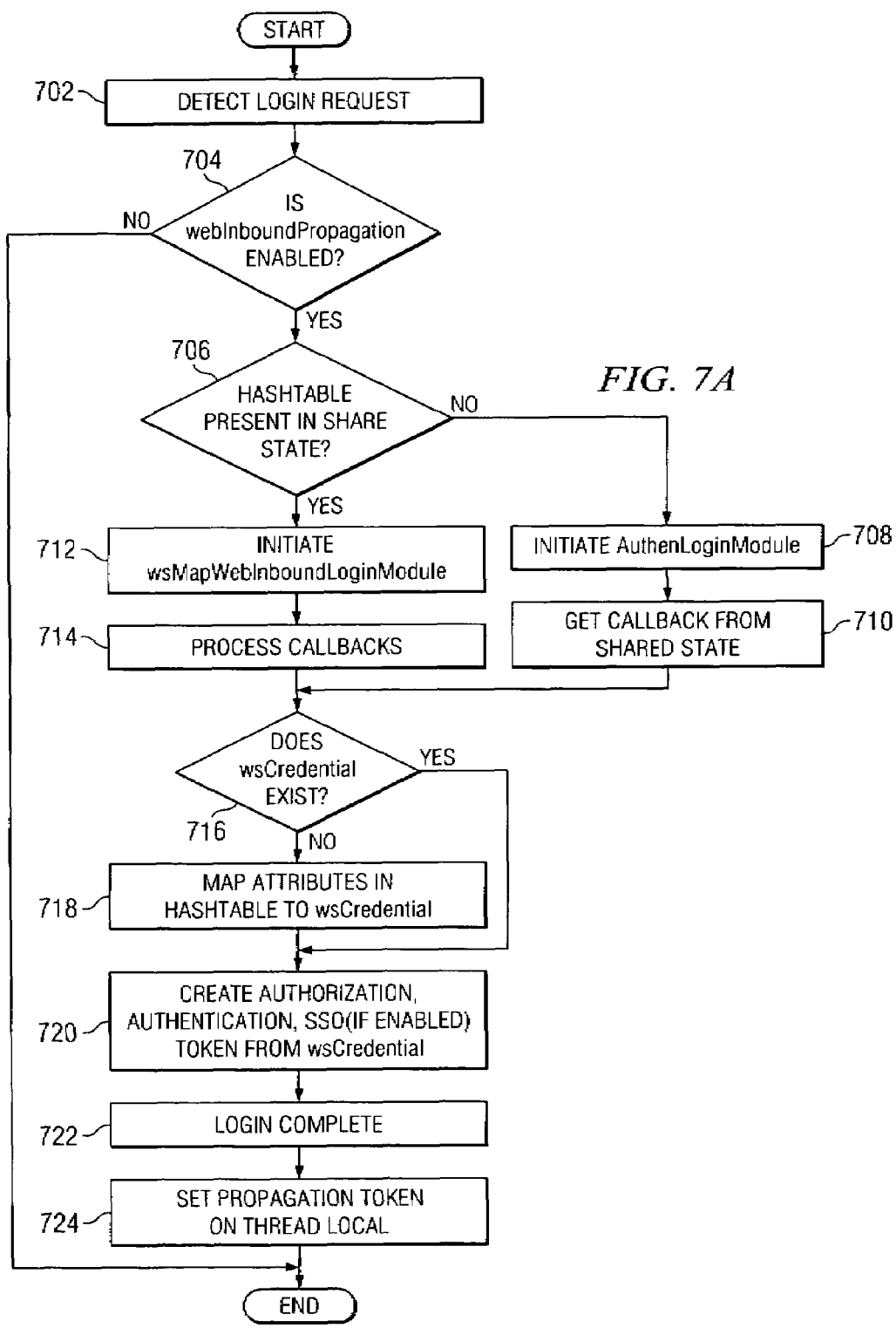
FIG. 7A is an exemplary flowchart illustrating operation from a source server's perspective when Web inbound login configuration is loaded in accordance with a preferred embodiment of the present invention.

With reference to FIG. 7A, an exemplary flowchart illustrating operation from a source server's perspective when Web inbound login configuration is loaded is depicted in accordance with a preferred embodiment of the present invention. As depicted in FIG. 7A, operation begins when a login request is detected at a first server (block 702). A determination is then made by Web inbound login configuration as to whether Web inbound propagation is enabled (block 704). The determination is made based on a configuration attribute that is set in the top level properties of a security.xml file or system properties, for example.

If Web inbound propagation is disabled, operation terminates. If Web inbound propagation is enabled in block 704, Web inbound login configuration determines whether a hash table is present in shared state of the login context (block 706). The hash table is used to specify security attributes without using a user registry. Therefore, if a hash table exists, a registry call is not necessary.

If a hash table does not exist in shared state, Web inbound login configuration invokes authentication login module (block 708), which gets callbacks from shared state (block 710). If a hash table exists in shared state in block 706, Web inbound login configuration bypasses initial login and invokes map Web inbound login module (block 712). Map Web inbound login module processes callbacks (block 714), which include name callback, password callback, credential token callback and token holder callback. Credential token callback returns a LTPA token and token holder callback returns an array list of token holder objects.

Once callbacks are processed or gathered, a determination is made as to whether a credential of the Subject exists (block 716). A credential is created based on typical login information, such as a single sign-on token or userid/password callbacks. If a credential does not exist, map Web inbound login module maps attributes from the hash table (block 718). If a credential already exists, map Web inbound login module creates and initializes an authorization token, an authentication token, and a single sign-on token, if single sign on is enabled, using attributes from the credential (block 720).

Once the marker tokens are created, login is complete (block 722) and the propagation token is set by map Web inbound login module to the thread of execution or thread local (block 724). Thus, the operation terminates thereafter.

Figure 7B:
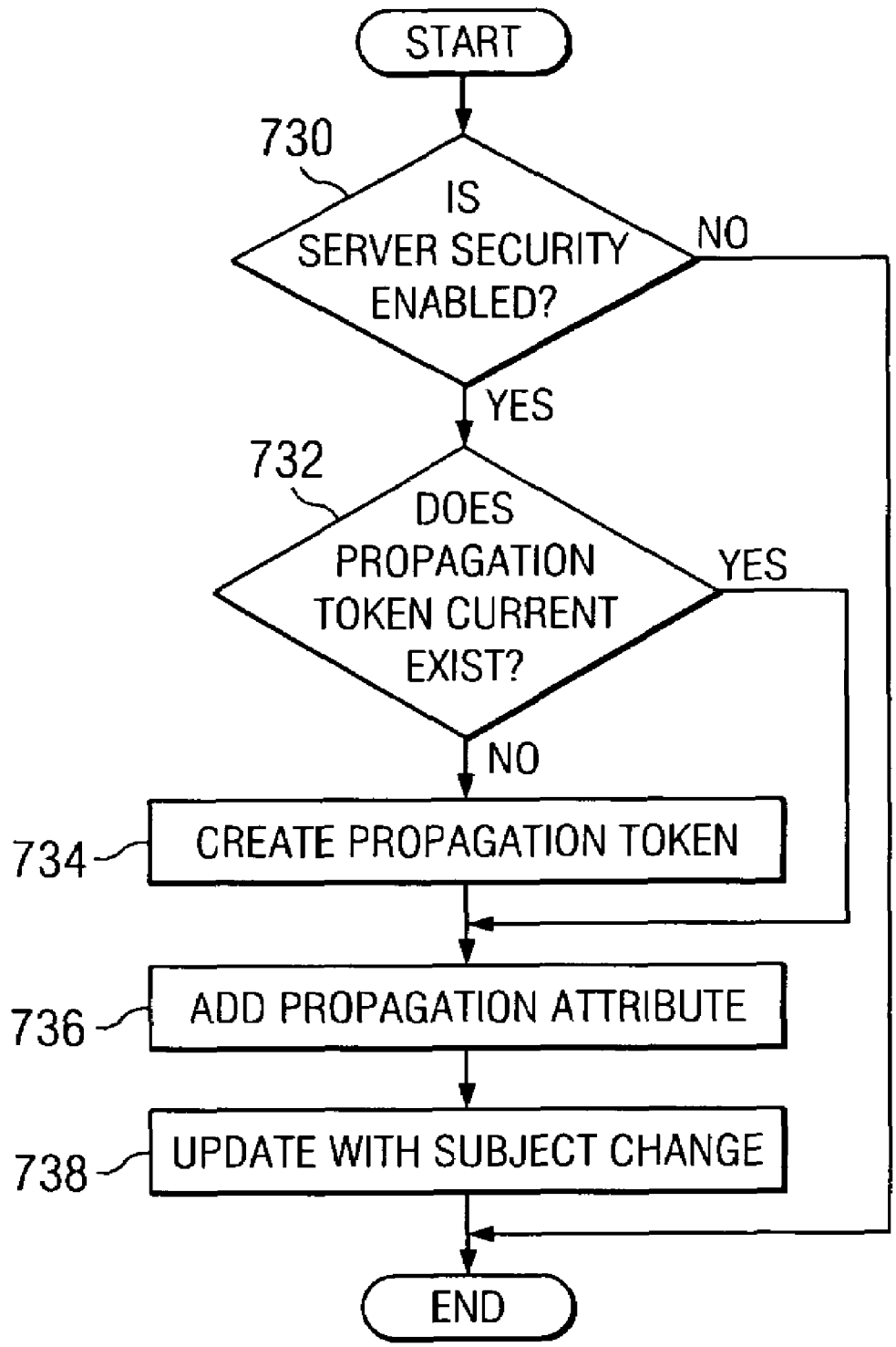
FIG. 7B is an exemplary flowchart illustrating operation of setting propagation token on thread local in accordance with a preferred embodiment of the present invention.

With reference to FIG. 7B, an exemplary flowchart illustrating operation of setting propagation token on thread local is depicted in accordance with a preferred embodiment of the present invention. This flowchart operation depicts block 724 in FIG. 7A in further detail.

As depicted in FIG. 7B, the operation begins with a determination as to whether server security is enabled at the current server (block 730). The server security determines the state of security enablement for an application server process. If server security is disabled, operation terminates. If server security is enabled in block 730, a determination is then made as to whether propagation token currently exists in the credential (block 732). The determination is made by examining the security context stored in thread local. If a propagation token does not exist, a new propagation token is created and placed in the security context of thread local (block 734).

Once a propagation token is created or if a propagation token already exists, attributes may be added by a service provider to the propagation token (block 736). Added Attributes may include authentication strength, authentication location, and time of day. Finally, the caller list of the propagation token is updated if a user switch occurs and the host list is updated with a host identifying the current server or resource (block 738). The caller list may be appended, for example, in the form of cell:node:server:caller. The host list may be appended, for example, in the form of cell:node:server. Thus, operation terminates thereafter.

Figure 8:
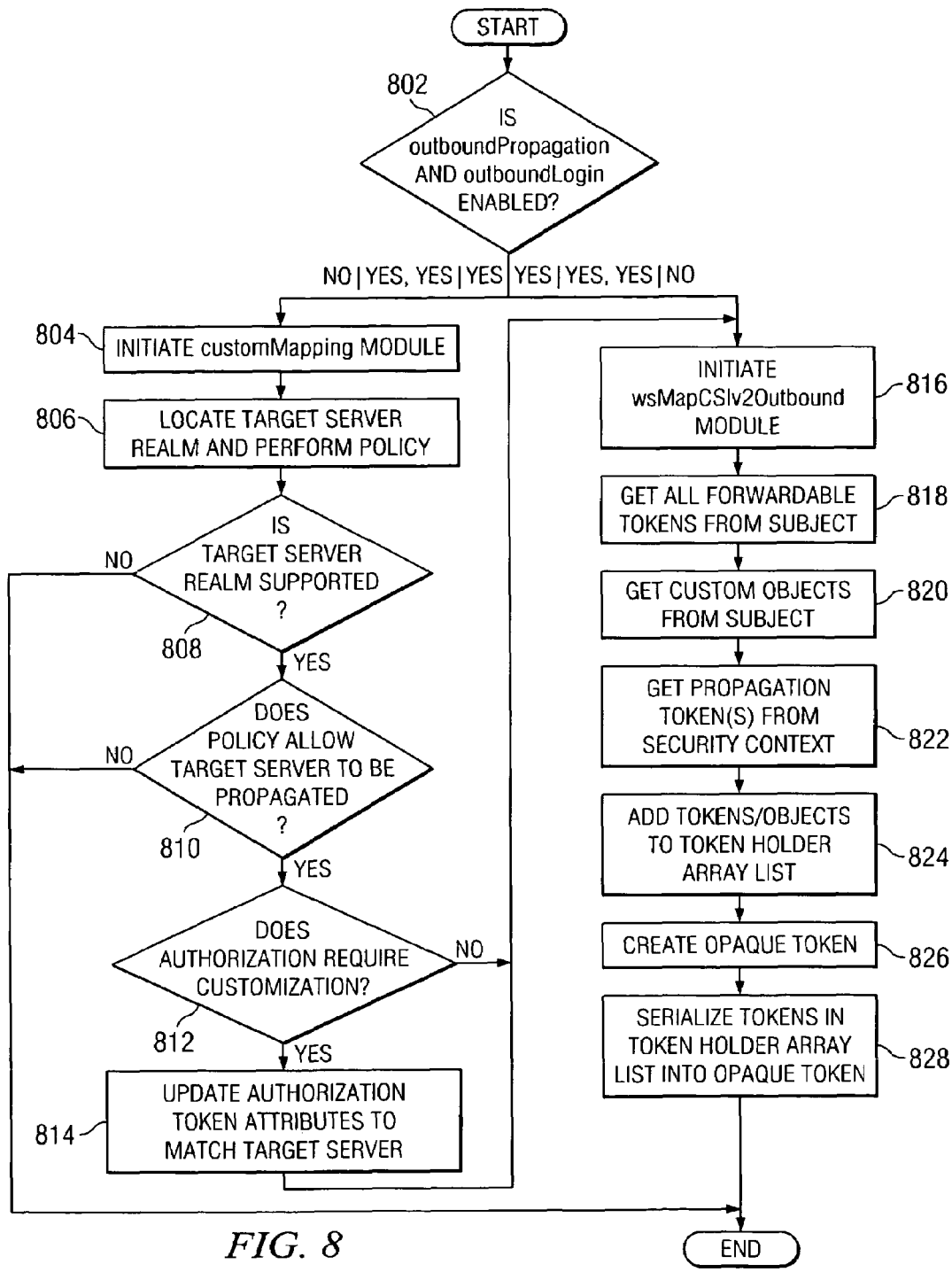
FIG. 8 is an exemplary flowchart illustrating operation from a source server's perspective when outbound login configuration is loaded in accordance with a preferred embodiment of the present invention.

Turning next to FIG. 8, an exemplary flowchart illustrating operation from a source server's perspective when outbound login configuration is loaded is depicted in accordance with a preferred embodiment of the present invention. As illustrated in FIG. 8, the operation begins with a determination of whether outbound propagation and outbound login are enabled based on the configuration attributes set in the security.xml file or system properties (block 802). If one or more configuration attributes are enabled, outbound login configuration may either invoke custom mapping module (block 804) to to map tokens/users based on the target server realm or invoke map outbound module (block 816) to create opaque authorization token in order to serialize tokens to be propagated downstream. These two login modules are explained in further details below.

Turning back to block 802, if outbound propagation is not enabled, but outbound login is enabled, only the custom mapping module is invoked by outbound login configuration (block 804). If outbound propagation is enabled, but outbound login is disabled, map outbound login module is invoked (block 816).

When custom mapping module is invoked at block 804, it performs credential mapping by first locating target server realm and effective policy (block 806). The target server realm and effective policy is passed into the login configuration, by which a perform policy is generated. Next, a determination is made by custom mapping module as to whether the target server realm is supported (block 808). The determination is made by examining the target server realm passed in and identifying whether the current server realm matches the target server realm or that the target server realm is in a delimited list of supported/trusted realms. If the target server realm is not supported, the operation terminates.

Alternatively, if the target server realm is supported, a determination is then made by the custom mapping module as to whether perform policy allows the target server to be propagated (block 810). If the perform policy does not allow the target server to be propagated, operation terminates. If the perform policy allows target server to be propagated in block 810, a determination is made as to whether current authentication token or authorization attributes requires customization (block 812). If customization is not required, the operation continues to block 816 to invoke map outbound login module. Otherwise, if customization is required, the custom mapping module maps the current authentication token or authorization attributes to a new identity that the target server will understand using service configuration name of the target server and the operation continues to block 816 to invoke map outbound login module.

Once map outbound login module is invoked by outbound login configuration at block 816, map outbound login module queries the Subject to get all forwardable tokens (block 818). The query is performed by searching credential of the Subject for any objects that implement the default token interface. Next, map outbound login module queries the Subject to get custom objects that are serializable (block 820). An exclude list is checked to ensure custom objects are not propagated if present on this list. This list may be a colon delimited list of class or package names. If a custom object equals the class name or starts with the package name, then it is not propagated.

Map outbound login module then queries the Subject for propagation tokens from the security context of the thread local that are forwardable (block 822). After tokens are located in blocks 818-822, a getBytes method is invoked on the token to return a byte array. This byte array is then added to the array list of token holders (block 824).

Once an array list of token block is created, an opaque authorization token is created (block 826) by instantiating an opaque token object, which may be a byte array. Finally, the opaque token byte array is populated by cycling the array list of token holders and serializing each token holder in the list into the byte array (block 826). Thus, operation terminates thereafter.

Figure 9:
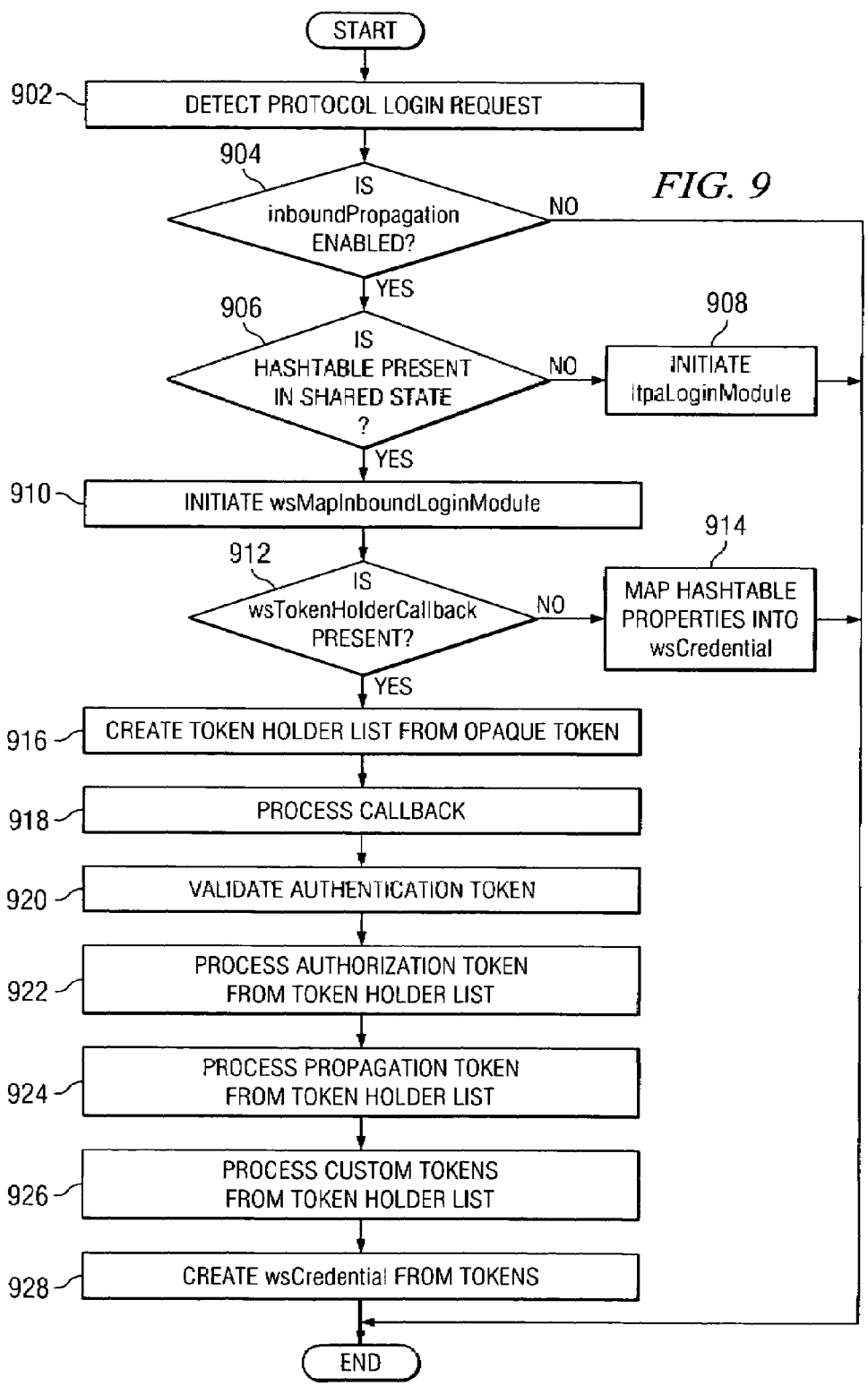
FIG. 9 is an exemplary flowchart illustrating operation from a target server's perspective when inbound login configuration is loaded in accordance with a preferred embodiment of the present invention.

Turning next to FIG. 9, an exemplary flowchart illustrating operation from a target server's perspective when inbound login configuration is loaded is depicted in accordance with a preferred embodiment of the present invention. As depicted in FIG. 9, the operation begins when a protocol login request is detected at target server, in this example, server 2 (block 902). A determination is then made by inbound login configuration as to whether inbound propagation is enabled (block 904). The determination is made based on the configuration attribute set in the security.xml file or system properties, for example. If inbound propagation is not enabled, the operation terminates. If inbound propagation is enabled, a determination is then made as to whether a hash table is present in the shared state of the login context (block 906).

If a hash table is not present, inbound login configuration invokes LTPA login module (block 908). The LTPA login module carries out primary login using normal authentication information, such as userid and password, LTPA token, or a TAI user name. However, if a hash table is present, the LTPA login module is bypassed and inbound login configuration then invokes map inbound:.login module (block 910) to perform primary login. Once the map inbound login module is invoked, a determination is made as to whether token holder callback is present (block 912). If the token holder callback is not present, map inbound login module maps well-defined attributes from the hash table into credential of the Subject (block 914) and the operation terminating thereafter.

However, if the token holder callback is present in block 912, map inbound login module creates an array list of token holders by deserializing the opaque authorization token received from the protocol (block 916). The login module first processes callbacks passed into a JAAS login via a token holder callback object (block 918).

Next, map inbound login module validates the authentication token passed in outside of the opaque authentication token (block 920). The map inbound login module then processes each authorization token in the array list of token holders deserialized from the opaque authorization token (block 922). The login module processes the authorization token by mapping the attributes in the token into credential of the Subject. If there is any custom authorization token implementation made by the service provider upstream, a custom login module should be plugged in just prior to or right after this block to handle the custom authorization token.

Once the authorization token is processed, man inbound login module then processes each propagation token in the array list of token holders (block 924). The login module processes the propagation token by setting it on the thread of execution of the current resource. If there is any custom propagation token implementation made by service provider upstream, a custom login module should be plugged in just prior to or right after this block to handle the custom propagation token.

Once the propagation token is processed, map inbound login module processes all custom tokens or objects that are serialized using normal Java™ serialization (block 926). This allows service provider upstream to implement custom object serialization and provide handler downstream to handle the object. Finally, map inbound login module creates a credential and principal needed at runtime from information in the processed authorization token and authentication token (block 928) with the operation terminating thereafter.

Figure 10:
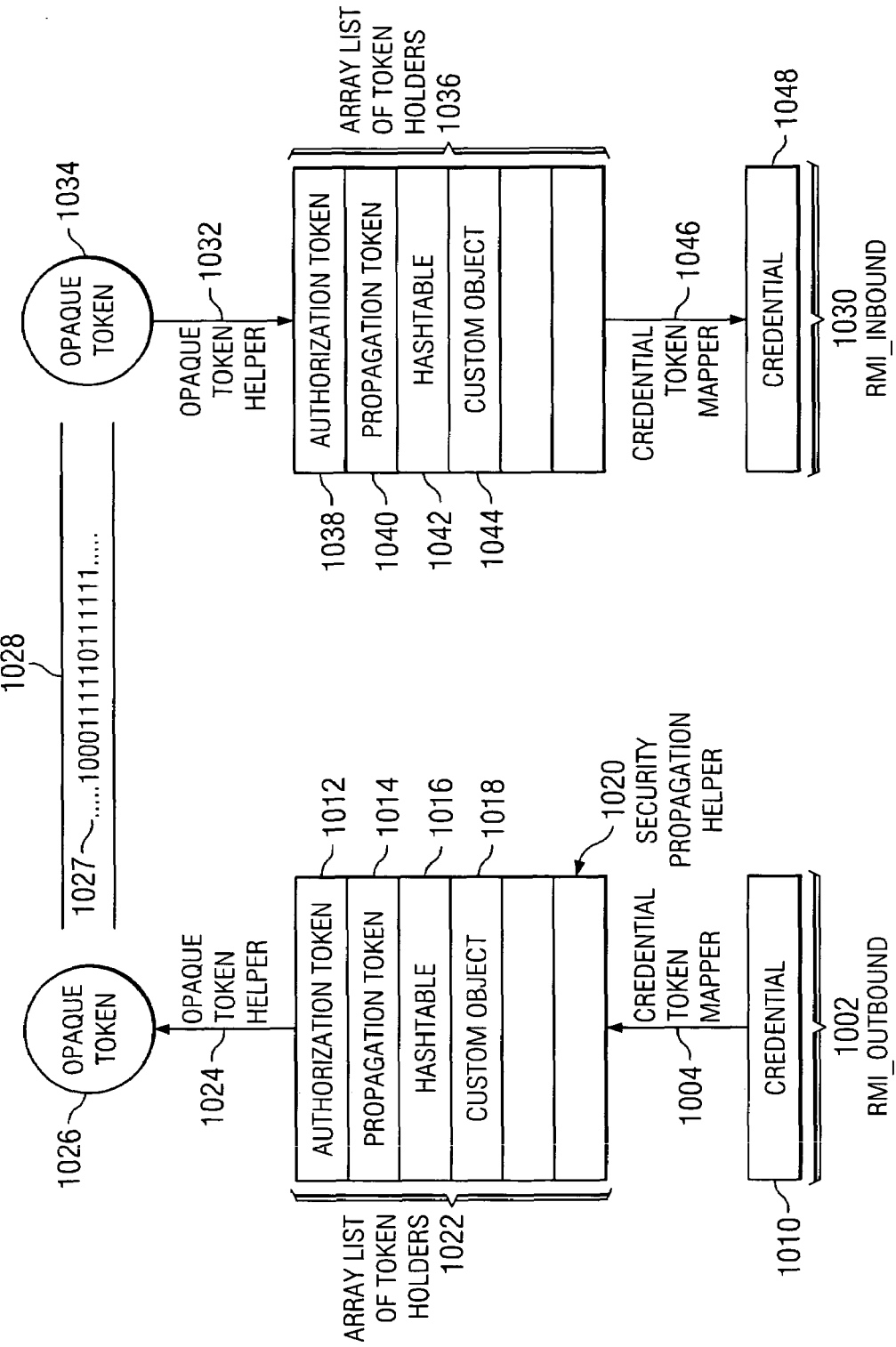
FIG. 10 is a diagram illustrating serialization and deserialization using exemplary mechanisms of the present invention in accordance with a preferred embodiment of the present invention.

Turning now to FIG. 10, a diagram illustrating serialization and deserialization using exemplary mechanisms of the present invention is depicted in accordance with a preferred embodiment of the present invention. As illustrated in FIG. 10, when an outbound request is detected by outbound login configuration 1002, credential 1010 in the Subject at run time is queried by map outbound login module, which is invoked by outbound login configuration 1002. The map outbound login module uses methods in credential token mapper 1004 to create different marker tokens, custom objects 1018 and hash table 1016 for propagation downstream. Credential token mapper 1004 provides methods that create authentication token and authorization token 1012 using attributes of the credential 1010, such as groups, access id, and long security name.

In addition, credential token mapper 1004 provides methods to create propagation token 1014 from the security context of the thread of execution, since propagation token 1014 is associated with a thread of execution, not credential 1010. Once the tokens are created, the map outbound login module uses methods provided by security propagation helper 1020 to get all forwardable tokens from credential 1010 and forwardable propagation token and add each token into an array list of token holders 1022. Next, the map outbound login module invokes the opaque token helper 1024 methods to create an opaque authorization token 1026 that is used to send tokens downstream. Then, opaque authorization token 1026 is serialized by map outbound login module into byte array 1027 and is propagated downstream using protocol 1028.

When byte array 1027 is received at a server or resource downstream, inbound login configuration 1030 detects the incoming request and invokes map inbound login module to call methods of opaque token helper 1032, in order to deserialize byte array 1027 into a opaque authorization token 1034. Opaque token helper 1032 provides methods that deserializes opaque authorization token 1034 into array list of token holders 1036. The array list includes authorization token 1038, propagation token 1040, hash table 1042 and custom objects 1044 that are propagated downstream.

Next, each token in array list of token holders 1036 is processed by map inbound login module to determine which of the token holders is desired based on the name and the version of the token holder. If the custom propagation token or authorization token is implemented upstream, custom login module may be implemented to identify the custom token. Once desired tokens are identified, the map inbound login module invokes methods in credential token mapper 1046 and maps authorization and authentication token obtained from the token holder to credential 1048.

Figure 11:
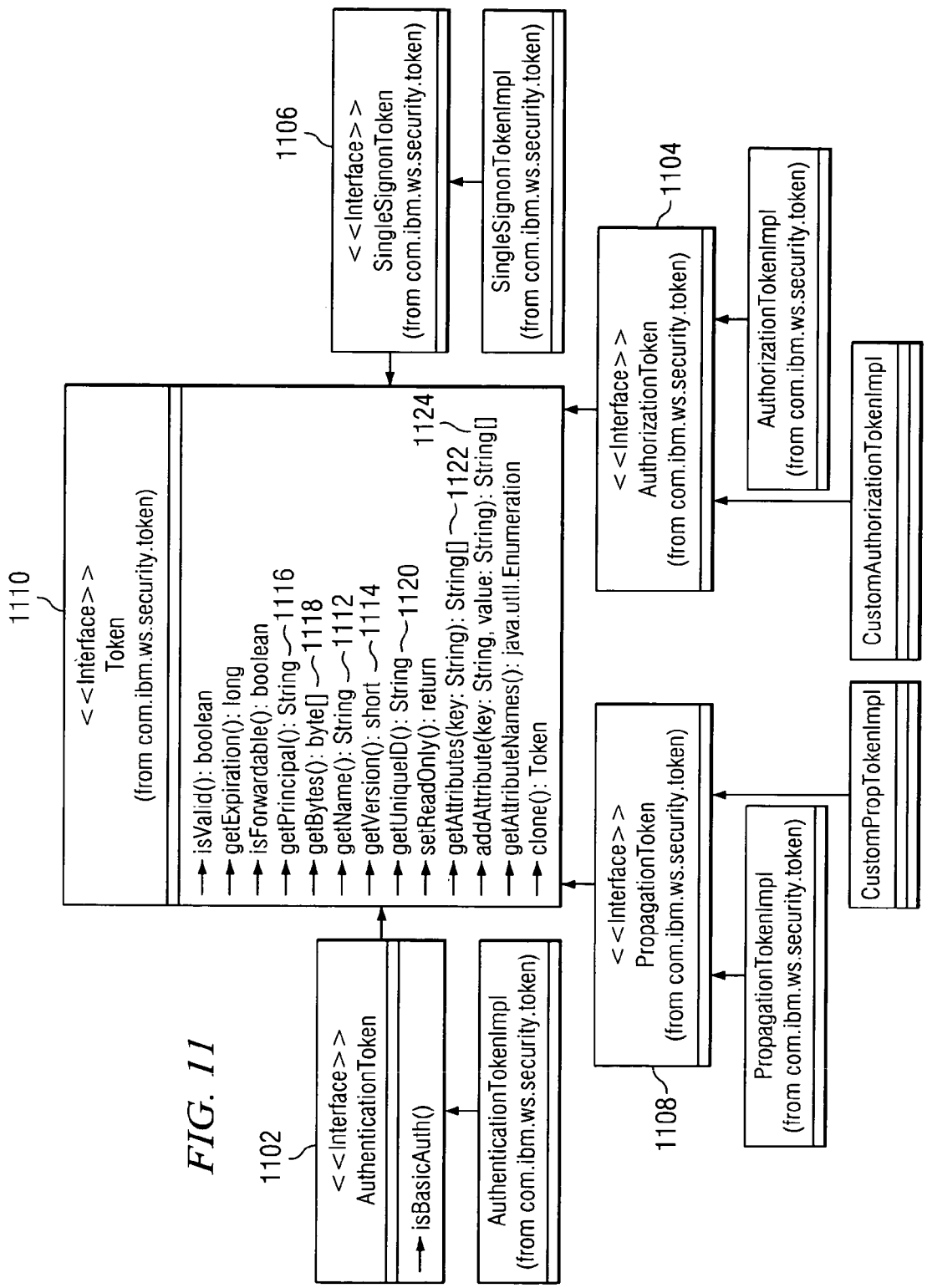
FIG. 11 is a diagram illustrating relationships between a set of marker token interfaces and a default token interface in accordance with a preferred embodiment of the present invention.

Turning now to FIG. 11, a diagram illustrating relationships between a set of marker token interfaces and a default token interface is depicted in accordance with a preferred embodiment of the present invention. As illustrated in FIG. 11, in this example implementation, the present invention provides four types of marker token interfaces: authentication token interface 1102, authorization token interface 1104, single sign-on token interface 1106 and propagation token interface 1108. Marker token interfaces 1102-1108 are token types that security infrastructure run time recognizes when security attributes are propagated downstream or when security attributes are mapped to credentials of a Subject. In exemplary aspects of the present invention, marker token interfaces 1102-1108 are used to define the behavior and purpose of security run time objects.

Each of marker token interfaces 1102-1108 extends from default token interface 1110. Default token interface 1110 includes a set of methods for identifying a specific token and managing security attributes stored in the token. These methods include getName 1112, getversion 1114, getPrincipal 1116, getBytes 1118, getUniqueID 1120, getAttributes 1122, and addAttribute 1124. Each of marker token interfaces 1102-1108 implements these methods by default.

GetName 1112 defines the name of a token, which identifies the owner of the token. GetVersion 1114 defines the version of a token. The combination of name and version of a token allows a service provider downstream to identify a specific token from the array list of token holders. GetPrincipal 1116 associates principal of a token with an authentication token. GetBytes 1118 returns a byte array stored in a token based on a name and a version. GetBytes 1118 may be used by the security infrastructure run time to serialize security attributes prior to propagating downstream. GetBytes 1118 may also be used by a service provider downstream to retrieve a desired token.

GetUniqueID 1120 controls how a Subject is cached when values from all the tokens within a Subject are aggregated and propagated downstream. GetUniqueID 1120 also allows a service provider downstream to look up a particular subject at run time. GetAttributes 1122 allows a service provider to retrieve custom attributes stored in a token during authentication login based on a given key. AddAttributes 1124 allows a service provider to append custom attribute to the end of an attribute list with a given key. Once an attribute is appended to the list, it may not be removed.

Figure 12A:
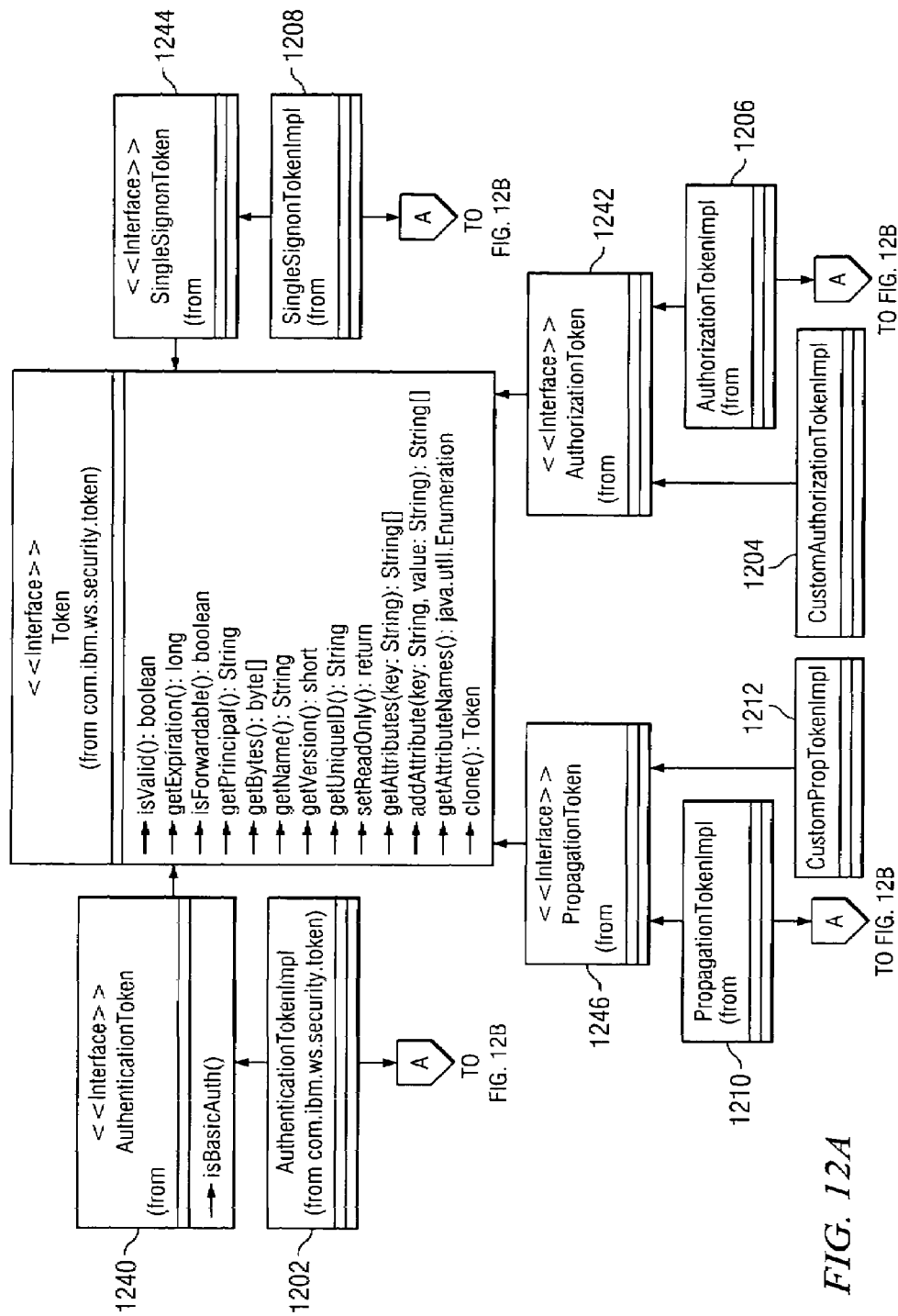
FIG. 12A is a diagram illustrating relationships between a set of marker token interfaces in accordance with a preferred embodiment of the present invention.

Turning now to FIG. 12A, a diagram illustrating relationships between a set of marker token interfaces is depicted in accordance with a preferred embodiment of the present invention. As shown in FIG. 12A, in this example implementation, the present invention includes six marker token implementations: authentication marker token 1202, authorization token marker token 1204, custom authorization marker token 1206, single sign-on marker token 1208, propagation marker token 1210 and custom propagation marker token 1212.

Authentication marker token 1202 implements an authentication marker token interface 1240, such as authentication marker token interface 1102 in FIG. 11. Custom authorization marker token 1206 and authorization marker token 1204 implement an authorization marker token interface 1242, which represents authorization marker token interface 1104 in FIG. 11. Single sign-on marker token 1208 implements a single sign-on marker token interface 1244, which represents single sign-on marker token interface 1106 in FIG. 11. Propagation marker token 1210 and custom propagation marker token 1212 implement a propagation marker token interface 1246, which represents propagation marker token interface 1108 in FIG. 11.

Figure 12B:
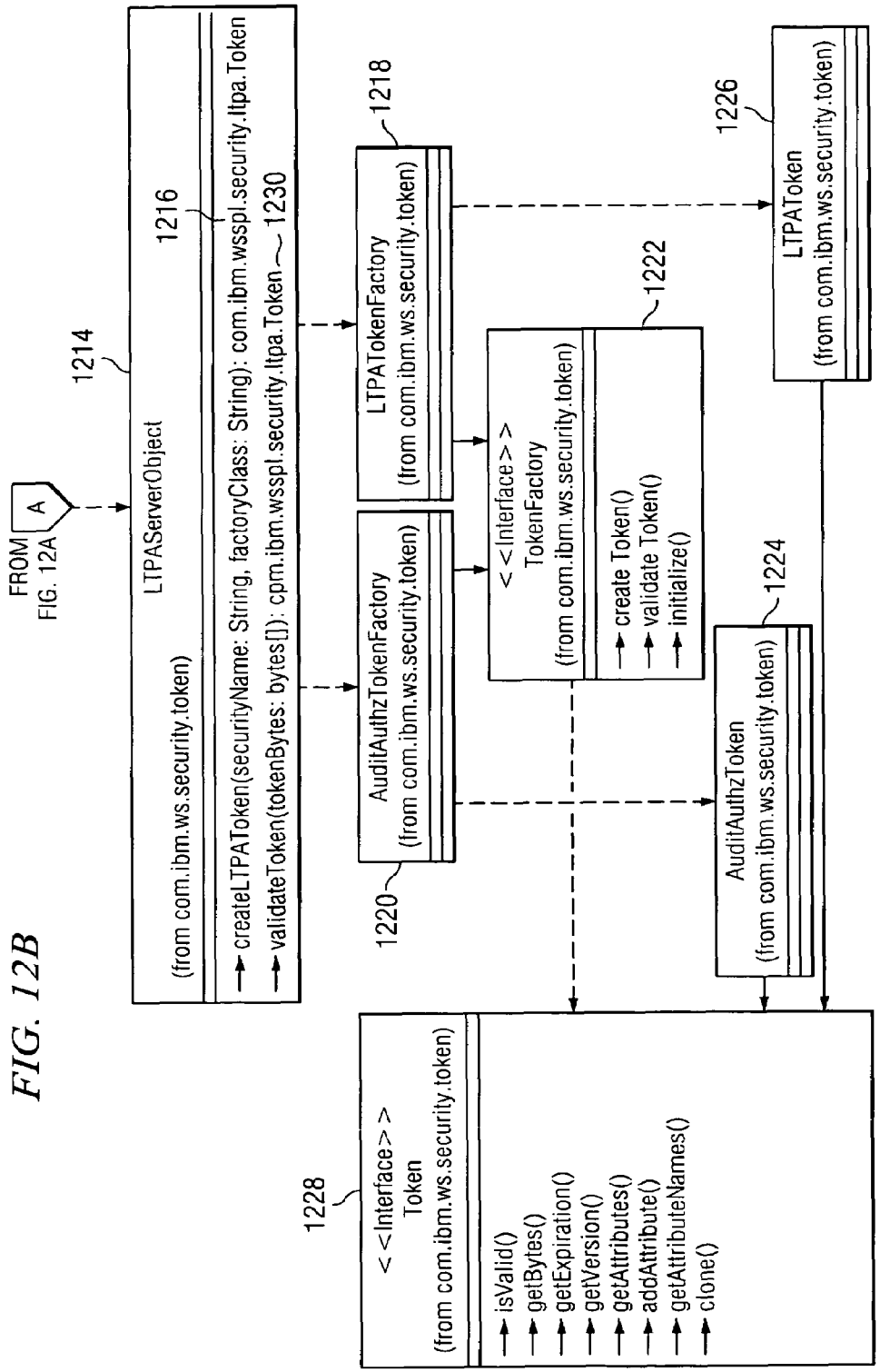
FIG. 12B is a diagram illustrating relationships between the set of marker token implementations in FIG. 12A, a token service, a default token factory, and a set of token factory interfaces in accordance with a preferred embodiment of the present invention.

Turning now to FIG. 12B, a diagram illustrating relationships between the set of marker token implementations in FIG. 12A, a token service, a default token factory, and a set of token factory interfaces is depicted in accordance with a preferred embodiment of the present invention. As depicted in FIG. 12B, token server 1214 provides methods to create and validate tokens, such as marker tokens 1202, 1206, 1208 and 1210 in FIG. 12A. In this example, when a service provider wants to create an authentication marker token to be propagated downstream, the service provider calls createToken method 1216 of token service 1214. CreateToken method 1216 may then use LTPA token factory 1218 to create the authentication marker token.

When the service provider wants to create an authorization marker token to be propagated downstream, the service provider calls createToken method 1216 of token service 1214. However, instead of using LTPA token factory 1218, createToken method 1216 uses AuditAuthz token factory 1220. LTPA token factory 1218 and AuditAuthz token factory 1220 both extends from default token factory 1222.

Default token factory 1222 is used to change encoding/encryption levels of any default implementation of the four marker token interfaces, which include authorization, authentication, single sign-on and propagation marker token interfaces. Thus, LTPA token factory 1218 and AuditAuthz token factory 1220 may create tokens with different encoding/encryption levels according to the need of the service provider. In this example, default token factory 1222 creates either AuditAuthz token 1224 or LTPA 1226 token, both of which implement default token interface 1226. Default token interface 1228 defines methods required by any token implementation that is associated with a marker token.

Alternatively, rather than using LTPA token factory 1218 or AuditAuthz token factory 1220 to create tokens with different encoding/encryption levels, the service provider may create a custom authentication, authorization, propagation or single sign-on token and define encoding/encryption details within the token created. In this case, the service provider calls the getBytes method of the marker token to retrieve the byte array stored within the marker token and performs encoding/encryption to the byte array prior to serializing and propagating the token downstream.

Once the propagated token is detected downstream, a service provider may implement a custom login module in the inbound login configuration. The custom module deserializes the token and extracts a token holder from an array list of token holders based on a desired name and version of the token.

Once the token holder is retrieved, the custom login module extracts a byte array from the token holder by using the getBytes method and calls a validateToken method 1230 of token service 1214 to validate the token. ValidateToken method 1230 first attempts to use default token factory 1222 to validate the token using encoding/encryption levels defined in LTPA token factory 1218 or AuditAuthz token factory 1220.

If validation fails, validateToken method 1230 iterates through all registered token factories to find a factory that will validate the token. Registered token factories may include authentication token factory, authorization token factory, propagation token factory, and single sign-on token factory. These registered token factories validate the token by using encoding/encryption details that are embedded in the corresponding custom marker token.

Figure 13:
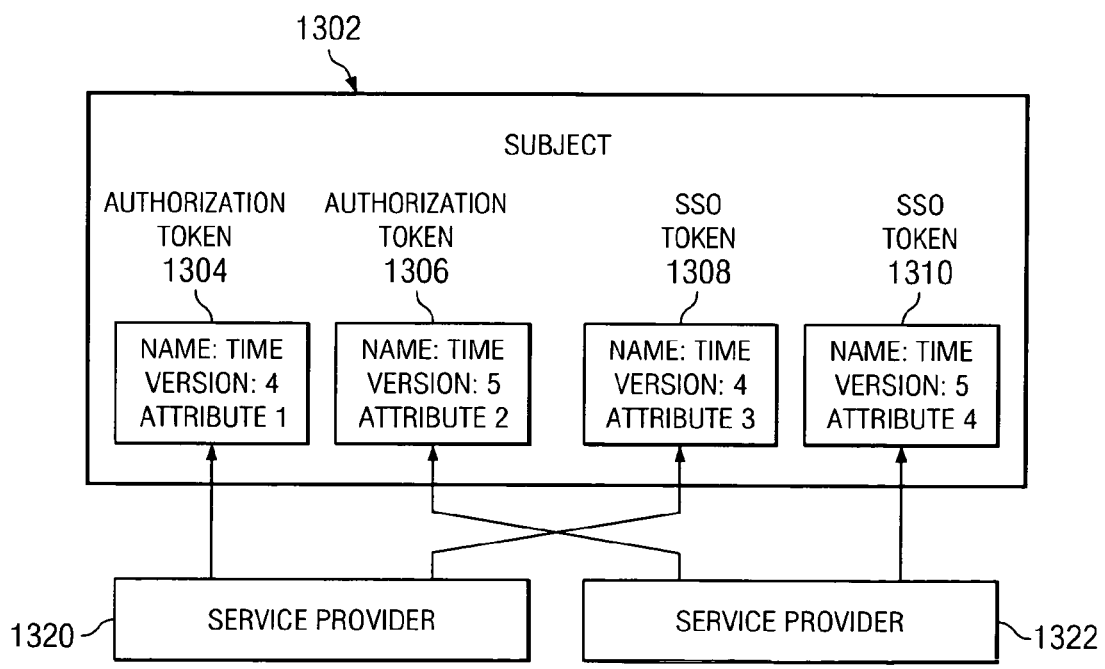
FIG. 13 is a diagram illustrating an exemplary implementation of multiple marker tokens within a Subject by different service providers in accordance with a preferred embodiment of the present invention.

Turning now to FIG. 13, a diagram illustrating an exemplary implementation of multiple marker tokens within a Subject by different service providers is depicted in accordance with a preferred embodiment of the present invention. As illustrated in FIG. 13, Subject 1302 includes four marker tokens: authorization token 1304, authorization token 1306, single sign-on token 1308 and single sign-on token 1310.

In this example, service provider 1320 creates authorization token 1304 in order to store attribute required when Subject 1302 tries to login at 4 pm. Within authorization token 1304, a name of 'time', a version of '4' and a custom attribute of 'attribute 1' are stored. Similarly, service provider 1322 creates authorization token 1306 to store attribute required when subject 1302 tries to login at 5 pm. Within authorization token 1306, a name of 'time', a version of '5' and a custom attribute of 'attribute 2' are stored.

Using the token interface provided by the present invention, a service provider downstream may retrieve corresponding attribute, 'attribute 1', by querying the array list of token holder for a name of 'time' and a version of '4'. Thus, 'attribute 1' is retrieved to make authorization decision for Subject 1302 at 4 pm.

Since the type of marker token is identified by the security infrastructure run time based on the marker token interface it implements, in this case, an authorization token, the service provider may distinguish the type of marker token within a Subject as well as each marker token of the same type within a Subject.

In addition, multiple single sign-on (SSO) tokens may be implemented within a Subject. For example, service provider 1320 creates SSO token 1308, which returns a different cookie to the client browser via a HTTP response based on the time Subject 1302 logs on the system. SSO token 1308 returns a different cookie than SSO token 1310, which is created by service provider 1322. In this example, SSO token 1308 includes a name of 'time', a version of '4' and a custom attribute of 'attribute 3'. SSO token 1310 includes a name of 'time', a version of '5' and a custom attribute of 'attribute 4'. By querying the name and the version of SSO token, different cookie may be returned at different times.

Thus, using the token framework of the present invention, security infrastructure run time may identify the purpose and behavior of run time security objects for handling purposes. The purpose and behavior of the security run time objects is determined based on the type of marker token interface that the marker token implements.

In summary, the token interface framework provides extensibility to the security infrastructure in many ways. The default token interface allows custom attributes to be added and propagated downstream in the form of a key and value pair. The key and values are:, stored within the token. A service provider may add any number of custom authorization, authentication, or-single sign-on tokens to a Subject and set any number of custom propagation tokens on the thread of execution.

A service provider may also plug encryption details in a marker token by implementing the default token interface and default token factories. In addition, a service provider may implement custom marker tokens to perform custom encryption using the getBytes method. The service provider then validates the token received downstream by using a custom login module that looks for a specific token holder containing a specific name and version. Moreover, the present invention allows multiple marker tokens of the same type to be implemented within a Subject. By implementing default marker token interfaces, the lack of common definition for run time security objects is eliminated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

What is claimed is:

1. A method operable by a data processing system for identifying purpose and behavior of run time security objects, the method comprising:

detecting, by the data processing system, a security object at run time, wherein the security object includes security attributes of a user;

examining, by the data processing system, the security object for a token interface implementation;

determining, by the data processing system, a purpose and behavior of the security object based on the token interface implementation, wherein determining the purpose and behavior of the security object includes determining whether the token interface implementation implements one of a set of token interfaces, wherein the set of token interfaces extends from a default token interface and wherein the default token interface includes a set of methods implemented by the security object for identifying the security object and managing security attributes stored in the security object; and handling, by the data processing system, the security object according to the purpose and behavior of the security object, wherein the security object is a token generated at run time by a service provider that receives a request for a service from the user, wherein the token is associated with a subject stored in a cache of the data processing system, wherein the subject represents the user, and wherein the subject stored in the cache of the data processing system includes at least two of the security objects generated at run time by the service provider.

2. The method of claim 1, wherein the token associated with a subject includes a name, a version, a byte array, and one or more security attributes for the subject.

3. The method of claim 2 wherein the subject includes at least two tokens, including at least two of an authentication token, an authorization token, a propagation token, a single sign-on token and a custom token, and wherein the user is another service provider providing a another service to an end user in response to receiving an end user request for the another service.

4. The method of claim 1 wherein handling the security object according to the purpose and behavior of the security object comprises:

determining whether the token interface implementation implements a custom token interface;

if the token interface implementation implements a custom token interface, invoking a get bytes method included in the set of methods of the security object to retrieve a byte array from the security object based on a name and a version, and convert the byte array into a credential within the subject.

5. The method of claim 1 wherein the subject includes a plurality of security objects created by a plurality of service providers for determining security attributes associated with the subject, and wherein at least two of the plurality of security objects implements a same token interface.

6. The method of claim 4 wherein the get bytes method encrypts the byte array according to encryption details in the security object and returns the encrypted byte array.

7. The method of claim 4, further comprising:

validating the byte array.

8. The method of claim 7 wherein validating the byte array includes iterating a set of token factories to determine a factory for validation.

9. The method of claim 8 wherein the set of token factories includes at least two of an authentication token factory, an authorization token factory, a propagation token factory, a single sign-on token factory and a default token factory.

10. A data processing system comprising a data processor and memory operatively coupled to the data processor for identifying purpose and behavior of run time security objects, the data processing system comprising:

detecting means for detecting, by the data processing system, a security object at run time, wherein the security object includes security attributes of a user;

examining means for examining, by the data processing system, the security object for a token interface implementation;

determining means for determining, by the data processing system, a purpose and behavior of the security object based on the token interface implementation, wherein the determining means includes means for determining whether the token interface implementation implements one of a set of token interfaces, wherein the set of token interfaces extends from a default token interface and wherein the default token interface includes a set of methods implemented by the security object for identifying the security object and managing security attributes stored in the security object; and handling means for handling, by the data processing system, the security object according to the purpose and behavior of the security object, wherein the security object is a token generated at run time by a service provider that receives a request for a service from the user, wherein the token is associated with a subject stored in a cache of the data processing system, wherein the subject represents the user, and wherein the subject stored in the cache of the data processing system includes at least two of the security objects generated at run time by the service provider, and wherein the handling means for handling the security object according to the purpose and behavior of the security object includes:

determining means for determining whether the token interface implementation implements a custom token interface;

if the token interface implementation implements a custom token interface, invoking means for invoking a get bytes method included in the set of methods of the security object to retrieve a byte array from the security object based on a name and a version, and convert the byte array into a credential within the subject.

11. The data processing system of claim 10, wherein the get bytes method encrypts the byte array according to encryption details in the security object and returns the encrypted byte array.

12. The data processing system of claim 10, further comprising: validating means for validating the byte array.

13. The data processing system of claim 12, wherein the validating means for validating the byte array includes iterating means for iterating a set of token factories to determine a factory for validation.

14. A computer program product stored in a computer readable, recordable-type medium and operable by a data processing system for identifying purpose and behavior of run time security objects, the computer program product comprising:

first instructions for detecting a security object at run time, wherein the security object includes security attributes of a user;

second instructions for examining the security object for a token interface implementation;

third instructions for determining a purpose and behavior of the security object based on the token interface implementation, wherein the third instructions for determining the purpose and behavior of the security object includes sub-instructions for determining whether the token interface implementation implements one of a set of token interfaces, wherein the set of token interfaces extends from a default token interface and wherein the default token interface includes a set of methods implemented by the security object for identifying the security object and managing security attributes stored in the security object; and fourth instructions for handling the security object according to the purpose and behavior of the security object, wherein the security object is a token generated at run time by a service provider that receives a request for a service from another entity, wherein the fourth instructions comprises:

first sub-instructions for determining whether the token interface implementation implements a custom token interface;

if the token interface implementation implements a custom token interface, second sub-instructions for invoking a get bytes method included in the set of methods of the security object to retrieve a byte array from the security object based on a name and a version, and convert the byte array into a credential within the subject, wherein the token is associated with a subject stored in a cache of the data processing system, wherein the subject represents the user, and wherein the subject stored in the cache of the data processing system includes at least two of the security objects generated at run time by the service provider.

15. The computer program product of claim 14, wherein the get bytes method encrypts the byte array according to encryption details in the security object and returns the encrypted byte array.

16. The computer program product of claim 14, further comprising: third sub-instructions for validating the byte array.

17. The computer program product of claim 16 wherein the third sub-instructions include instructions for iterating a set of token factories to determine a factory for validation of the token generated at runtime by the service provider.

* * * * *

UNITED STATES PATENT AND TRADEMARK OFFICE
CERTIFICATE OF CORRECTION

PATENT NO.       : 7,634,803 B2                           Page 1 of 1
APPLICATION NO.  : 10/882053
DATED            : December 15, 2009
INVENTOR(S)      : Birk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Ninth Day of November, 2010

David J. Kappos
*Director of the United States Patent and Trademark Office*